(12) United States Patent
Takahashi

(10) Patent No.: US 7,013,470 B2
(45) Date of Patent: Mar. 14, 2006

(54) DISK RECORDING-AND-REPRODUCING DEVICE HAVING OPENABLE LID PROVIDED WITH DISK HOLDER

(75) Inventor: Wataru Takahashi, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 172 days.

(21) Appl. No.: 10/658,262

(22) Filed: Sep. 10, 2003

(65) Prior Publication Data
US 2004/0057703 A1    Mar. 25, 2004

(30) Foreign Application Priority Data
Sep. 24, 2002    (JP) .............................. 2002-277071

(51) Int. Cl.
G11B 17/03  (2006.01)
G11B 17/04  (2006.01)
G11B 33/02  (2006.01)

(52) U.S. Cl. ..................................................... 720/617
(58) Field of Classification Search ................ 720/617, 720/619, 600, 647, 655; 369/75.11
See application file for complete search history.

(56) References Cited

U.S. PATENT DOCUMENTS 4,969,140 A * 11/1990 Koiwa et al. ................ 720/621
5,016,236 A *  5/1991 Cho .......................... 720/605
5,187,700 A *  2/1993 Yoon ......................... 720/612

* cited by examiner

Primary Examiner—Julie Anne Watko
(74) Attorney, Agent, or Firm—Wenderoth, Lind & Ponack, L.L.P.

(57) ABSTRACT

A disk recording-and-reproducing device includes a box-like casing and a lid hinged to the casing to rotate about its pivot for opening and closing the casing. The lid has a disk holder and a swingable L-shaped lever both fixed to its rear side. The swingable lever has an upper flat shelf to support a disk when inserted in the disk holder. Also, the swingable lever has a rubber boss fixed to its lower end, thereby making the lever stand upright in parallel with a rear side of the lid when the lid is opened. On the other hand, the casing has a counter projection formed in confronting relation with the lower end of the lever, thus making the lever swing about its pivot apart from a lower end of the disk holder when the lid shuts.

6 Claims, 7 Drawing Sheets

Fig. 7(a)
PRIOR ART
Fig. 7(b)
PRIOR ART
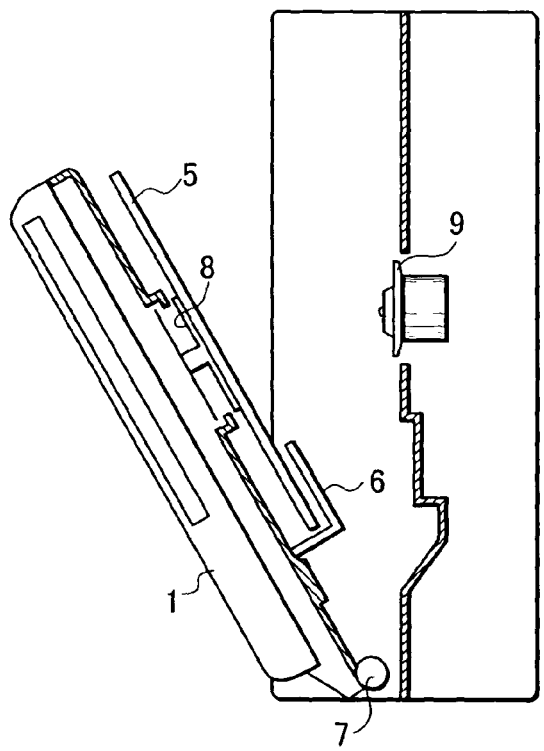
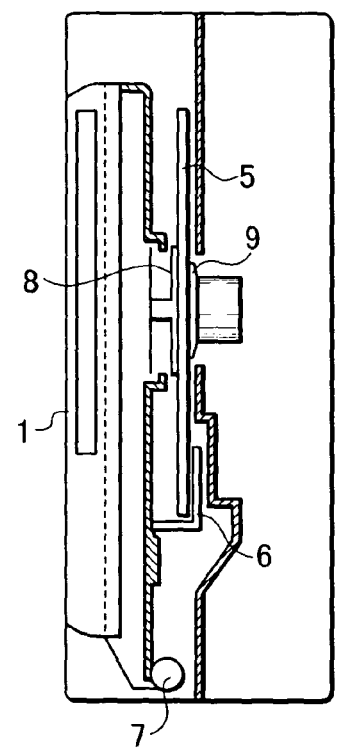

DISK RECORDING-AND-REPRODUCING DEVICE HAVING OPENABLE LID PROVIDED WITH DISK HOLDER

BACKGROUND OF THE INVENTION

1. Field of the Invention

The present invention relates to a device for recording and reproducing data from a disk such as a CD or DVD, and more particularly to a small-sized recording-and-reproducing device.

2. Related Art

FIG. 4 shows a small-sized disk recording-and-reproducing device commercially available. As shown, the device comprises a casing and a lid 1 hinged to the casing to open and close the casing. The lid 1 has a display 2 formed on its flat surface. The casing contains a recording-and-reproducing unit 3, which is partly exposed to confront the display 2 when the lid 1 is closed. The lid 1 is rotatable about its pivots 7, 7 to open and close the casing. When the lid 1 is inclined outward in its opening position, a disk 5 can be put in or removed from opening space 4 defined between the casing and the lid 1.

As seen from FIG. 5, the lid 1 has a "kangaroo" pocket-like disk holder 6 formed on its rear side. The disk holder 6 has a circular disk-catch projection 8 formed at a center of the lid 1. FIG. 6 shows the casing with the lid 1 removed therefrom. The recording-and-reproducing unit 3 is contained in the casing, and a turntable 9 appears on a front side of the casing. The disk 5 put in the disk holder 6 is sandwiched between the disk-catch projection 8 and the turntable 9 when the lid 1 is closed.

The disk recording-and-reproducing device as described above can have a minimum thickness; and the device can be loaded with a disk manually, thus requiring no automatic loading unit, which comprises a disk tray and a tray drive. When the lid 1 is open, the disk 5 can be removed from the opening space 4 between the casing and the lid 1, as described earlier. The disk 5 is put in the disk holder 6, and then the lid 1 is closed. In a closing position the disk 5 is held on its center by a central hub of the turntable 9, and it is kept free of any interference from surrounding things. Therefore, there is no fear of the disk 5 being damaged.

Referring to FIGS. 7(a) and 7(b), the disk 5 is put in the disk holder 6 of the inclined lid 1 (see FIG. 7a), and then, the lid 1 shuts to put the disk 5 on the turntable 9 (FIG. 7b). As seen from FIG. 7(a), the central hub of the turntable 9 is so chamfered that the disk 5 may be drawn and fitted onto the chamfered hub when the disk 5 is brought close to the turntable 9.

A range within which the disk 5 can be drawn and automatically centered relative to the hub of the turntable 9 is very limited, and therefore, when the disk 5 is not brought close enough to get within this limited range, it may be pinched between the turntable 9 and the disk-catch projection 8 in an off-center position, thereby taking a somewhat inclined posture. This will be a cause for damaging the disk.

One object of the present invention is to provide a disc recording-and-reproducing device which is capable of automatically putting a disk in centering position relative to a hub of a turntable.

SUMMARY OF THE INVENTION

To attain this object a disk recording-and-reproducing device comprising a box-like casing and a lid hinged to the casing to rotate about its pivot for opening and closing the casing, with the lid having a disk holder fixed to its rear side, is improved according to the present invention in that the lid has a swingable lever rotatably fixed to the rear side of the lid at a bottom of the disk holder. The swingable lever has a resilient boss such as a rubber piece fixed to its lower end, thereby making the swingable lever stand upright in parallel with the rear side of the lid when the lid is opened, and that the casing has a projection formed in confronting relation with the lower end of the swingable lever. The projection has an inclined top descending toward a free end so that the swingable lever is pushed on the lower side by the inclined top to slide thereon just before the lid completely shuts, thus making the swingable lever swing about its pivot apart from a lower end of the disk holder.

On inserting the disk 5 into the disk holder 6 and then shutting the lid 1, a central hole of the disk 5 is led to a central hub of the turntable 9, making the swingable lever 10 rotate about its pivots 11, 11; the swingable lever 10 is pushed on the lower side by an inclined top 14a of the projection 14 to slide thereon just before the lid 1 completely shuts. Thus, when the disk 5 is held between the turntable 9 and disk-catch projection 8, the swingable lever 10 is apart from rectangular notch 6a of the bottom of the disk holder 6, thus putting the disk 5 free in position.

The swingable lever may be an L-shaped piece having an upper flat shelf for supporting a disk when inserted into the disk holder.

Other objects and advantages of the present invention will be understood from the following description of a disk recording-and-reproducing device according to one preferred embodiment of the present invention, which is shown in accompanying drawings.

BRIEF DESCRIPTION OF THE DRAWINGS

FIG. 3(a) is a longitudinal sectional view of the disk recording-and-reproducing device with its lid opened, whereas

FIG. 7(a) is a longitudinal sectional view of the conventional device with its lid opened, whereas FIG. 7(b) is a similar longitudinal sectional view of the conventional device with its lid closed.

DETAILED DESCRIPTION OF PREFERRED EMBODIMENT

Figure 1:
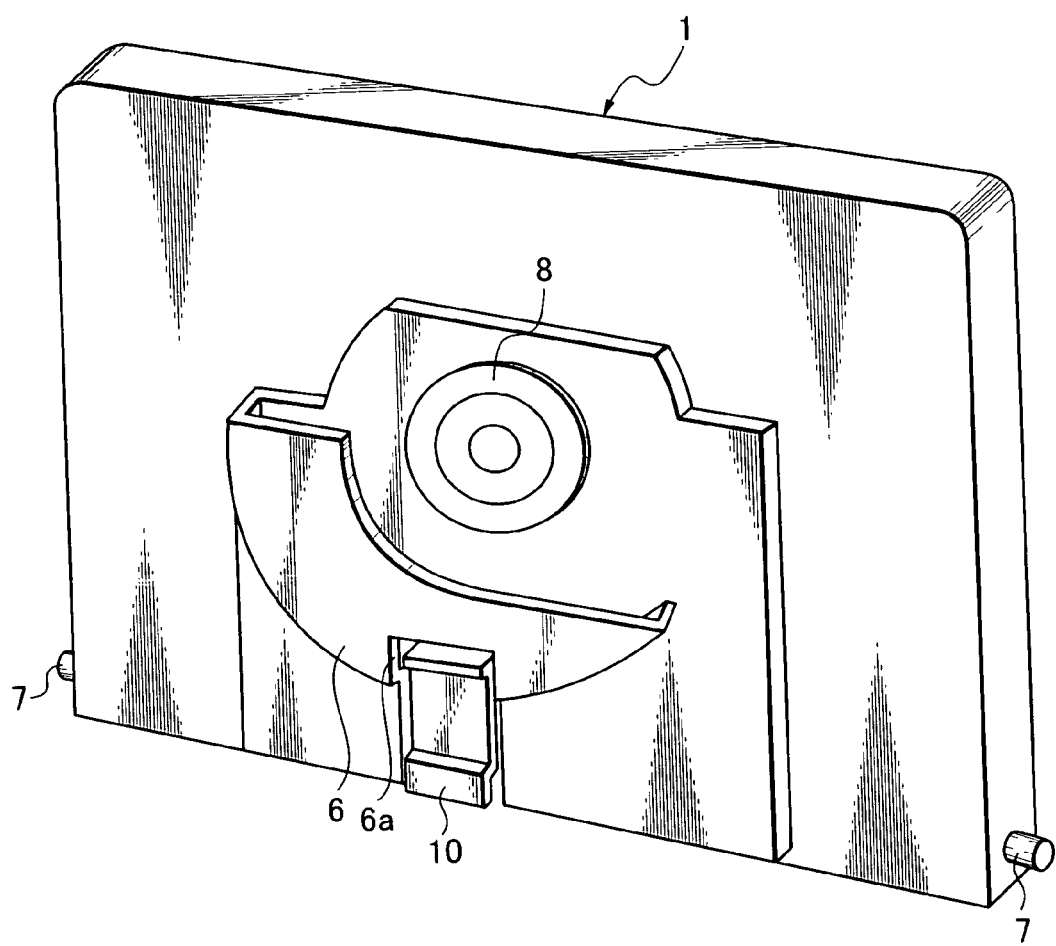
FIG. 1 is a perspective view of a lid of a disk recording-and-reproducing device according to the present invention as viewed from inside the device.
Figure 3A:
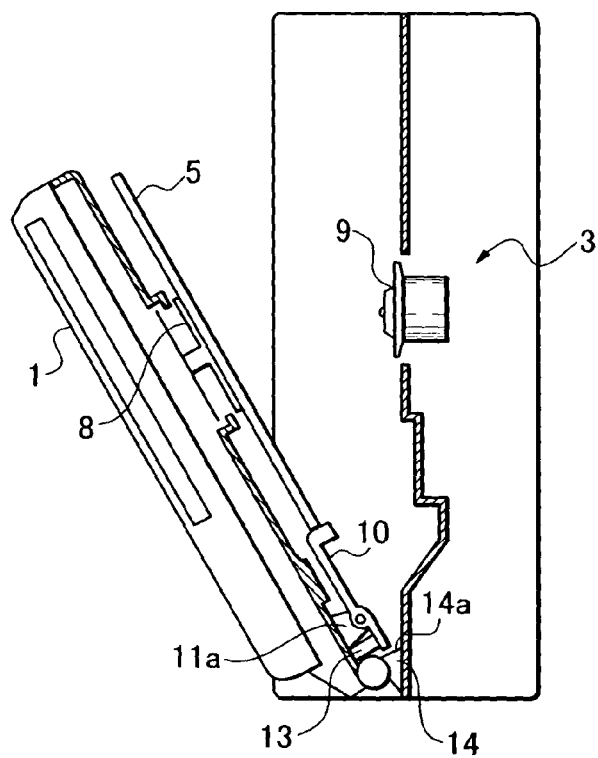
Figure 3B:
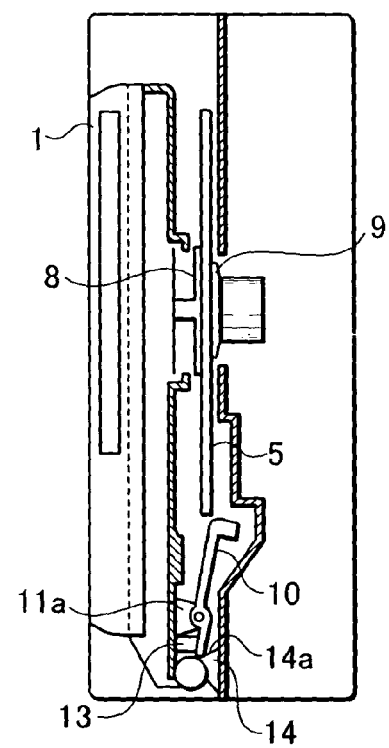
FIG. 3(b) is a similar longitudinal sectional view of the disk recording-and-reproducing device with its lid closed.
Figure 4:
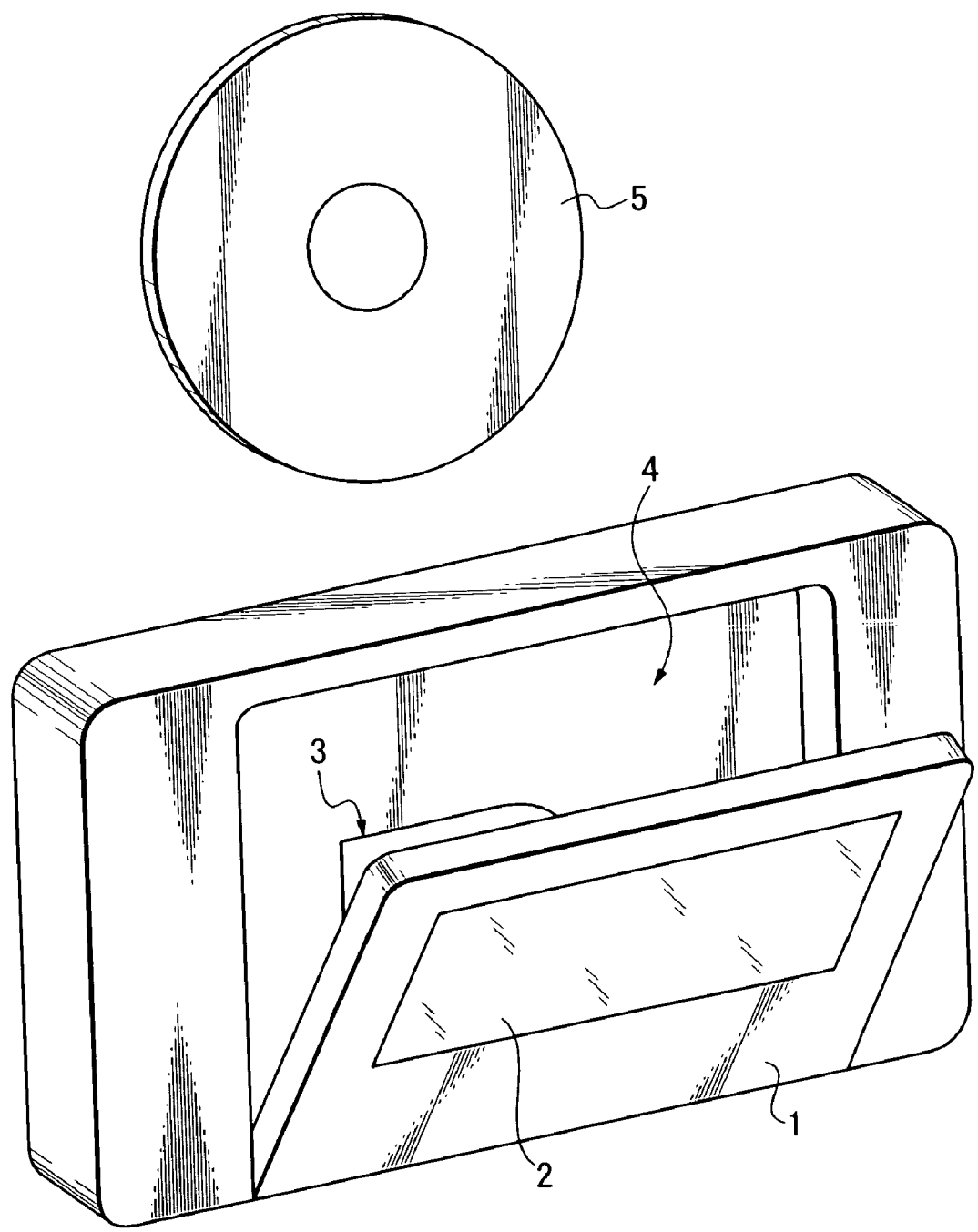
FIG. 4 is a perspective view of a conventional disk recording-and-reproducing device with its lid opened.
Figure 5:
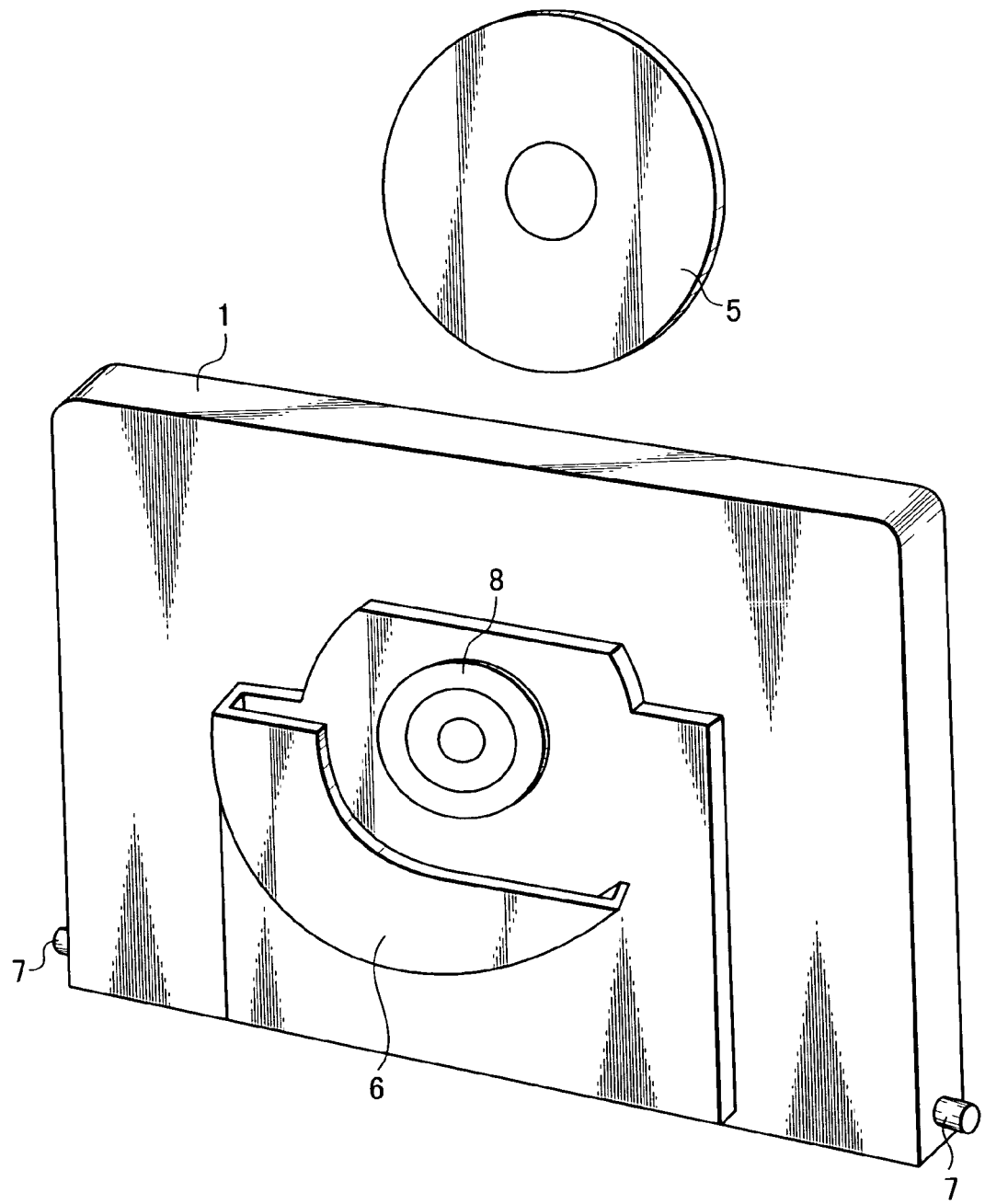
FIG. 5 is a perspective view of a lid of the conventional disk recording-and-reproducing device as viewed from inside the device.
Figure 6:
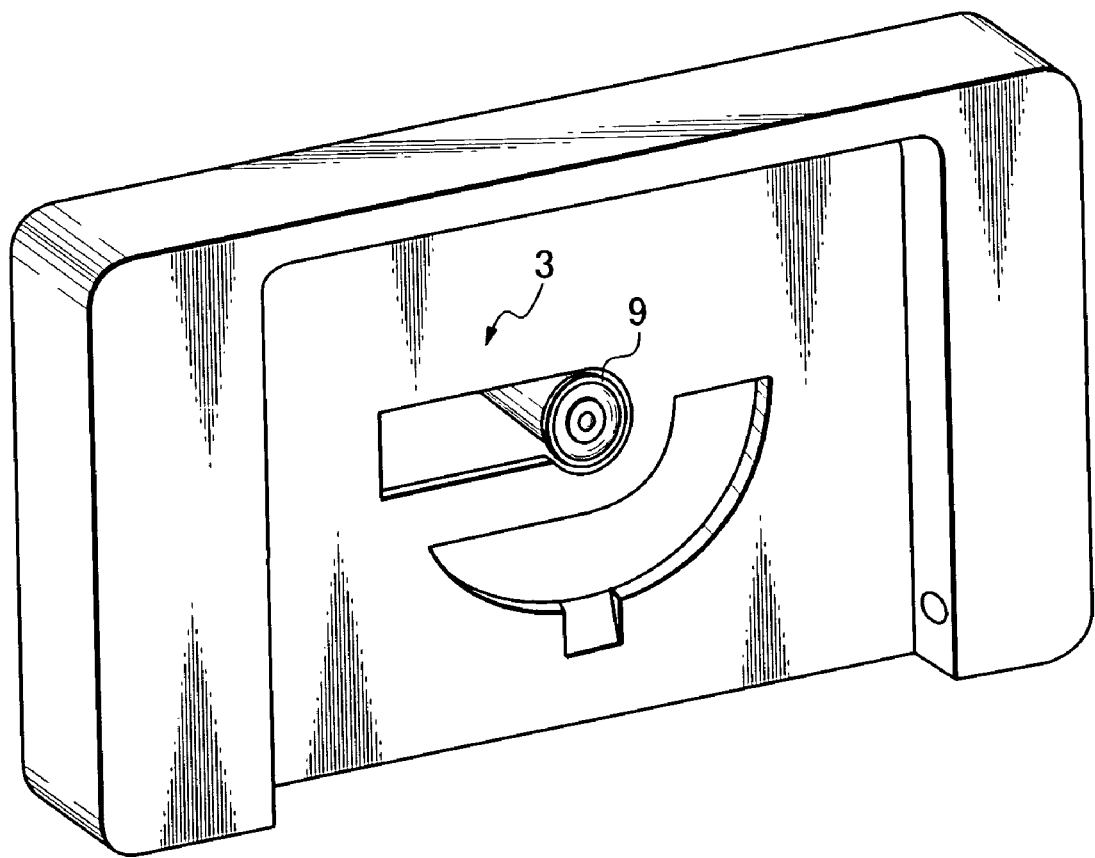
FIG. 6 is a perspective view of the conventional device with its lid removed, showing some parts of the device appearing on a front of a casing.

A recording-and-reproducing device according to the present invention is a small-sized disk device having a minimum thickness as seen from FIGS. 3(a) and 3(b), which basically is similar to the conventional recording-and-reproducing device. The device comprises a box-like casing and a lid 1 hinged to the casing so as to rotate about its pivot for opening and closing the casing. As seen from FIG. 1, the lid 1 has a disk holder 6 fixed to its rear side. The disk holder 6 has a disk-catch projection 8 at its center for holding a disk 5 between a confronting turntable 9 of a recording-and-reproducing unit 3. A rectangular notch 6a is formed at a bottom of the disk holder 6. Also, the lid 1 has round pivot projections 7, 7 projecting from its opposite lower corners. The lid 1 has a swingable lever 10 rotatably fixed to a rear side of the lid 1 with its shelf (later described) in the rectangular notch 6a of the disk holder 6.

Figure 2:
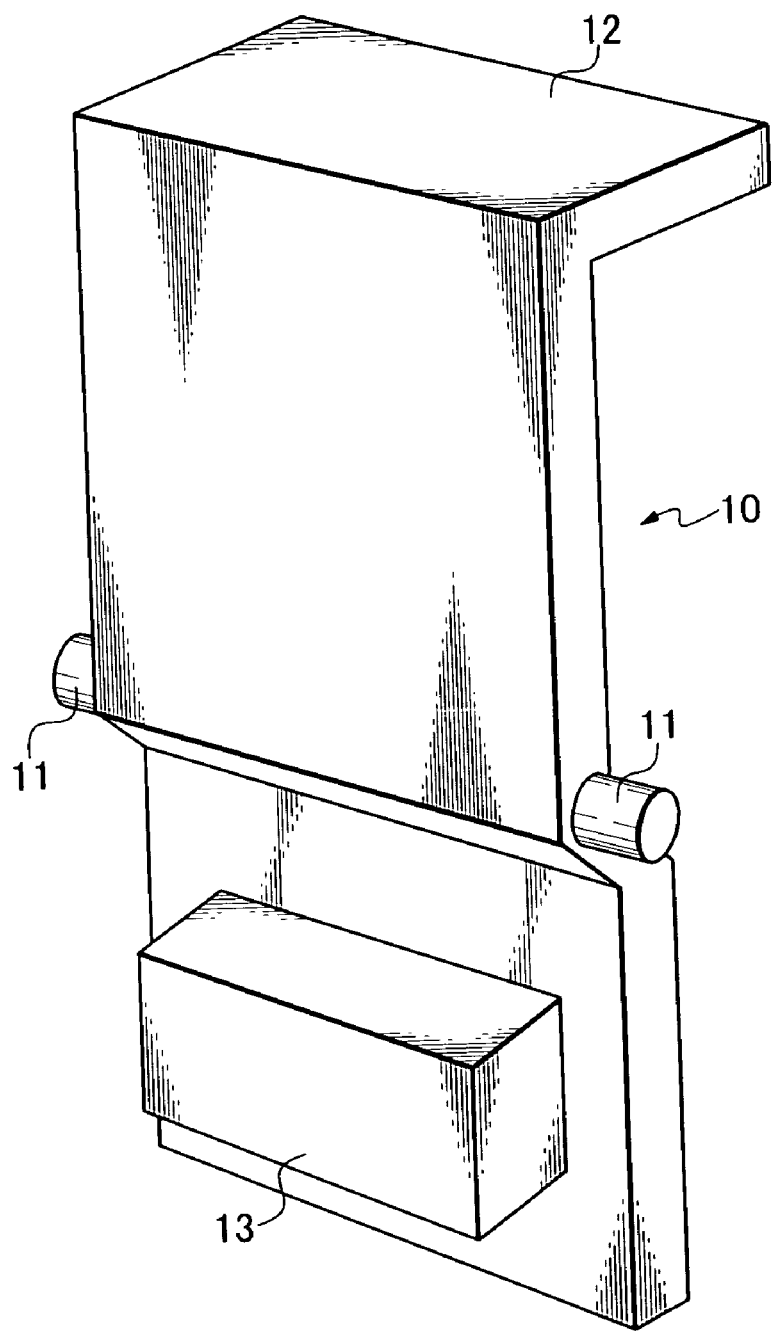
FIG. 2 is a perspective view of a swingable lever attached to a lower edge of a disk holder of the lid.

Referring to FIG. 2, the swingable lever 10 is an L-shaped piece having an upper flat shelf 12 for supporting the disk 5 when inserted in the disk holder 6. The lever 10 has round pivot bosses 11, 11 projecting from its opposite intermediate portions, and these pivot bosses 11 are fitted in counter bearings 11a, 11a, which are provided at lower ends of the disk holder 6 (see FIGS. 3(a) and 3(b)). Thus, the swingable lever 10 can swing about its pivot bosses 11. The swingable lever 10 has a resilient boss 13 such as a rubber piece fixed to its lower end, particularly below a pivot axle of the pivot bosses 11, thereby making the swingable lever 10 stand upright in parallel with the rear side of the lid 1 when the lid is opened (see FIG. 3a). When a disk 5 is inserted into the disk holder 6, the disk stays on the flat shelf 12 so that it may be put in an exact position relative to a central hub of the turntable 9 when the lid 1 is closed.

As seen from FIGS. 3(a) and 3(b), the casing has a projection 14 formed in confronting relation with the lower end of the swingable lever 10. The projection 14 has an inclined top 14a descending toward a free end. On inserting the disk 5 into the disk holder 6 and then shutting the lid 1, a central hole of the disk 5 is led to the central hub of the turntable 9, making the swingable lever 10 rotate about its pivots 11, 11; the swingable lever 10 is pushed on a lower side by the inclined top 14a of the projection 14 to slide thereon just before the lid 1 completely shuts. Thus, when the disk 5 is held between the turntable 9 and disk-catch projection 8, the swingable lever 10 is apart from the rectangular notch 6a of the bottom of the disk holder 6, thus putting the disk 5 free in position (see FIG. 3b).

As may be understood from the above, advantageously an allowance for making disk recording-and-reproducing devices is less severe, in respect of centering a disk relative to a hub of a turntable, than before.

What is claimed is:

1. A disk recording-and-reproducing device comprising:
    a box-like casing;
    a lid pivotally hinged to said box-like casing for opening and closing said box-like casing;
    a disk holder fixed to a rear side of said lid; and
    a lever rotatably fixed to said rear side of said lid at a bottom of said disk holder, said lever being constructed and arranged to be oriented parallel to said rear side of said lid when said box-like casing is not closed by said lid,
    wherein said box-like casing has a projection having an inclined top surface descending toward a free end, said projection being in a confronting relationship with a lower end of said lever such that said lower end of said lever is forced by said inclined top surface so as to cause said lower end of said lever to slide on said inclined surface just before said lid completely closes said box-like casing upon being pivoted, whereby said lever rotates away from a lower end of said disk holder.

2. The disk recording-and-reproducing device according to claim 1, wherein
    said lever is constructed and arranged to be oriented parallel to said rear side of said lid, when said box-like casing is not closed by said lid, via a resilient member fixed to a lower end of said lever.

3. The disk recording-and-reproducing device according to claim 2, wherein said resilient member comprises a rubber boss.

4. The disk recording-and-reproducing device according to claim 3, wherein
    said lever comprises an L-shaped piece having an upper flat shelf for supporting a disk when inserted into said disk holder.

5. The disk recording-and-reproducing device according to claim 2, wherein
    said lever comprises an L-shaped piece having an upper flat shelf for supporting a disk when inserted into said disk holder.

6. The disk recording-and-reproducing device according to claim 1, wherein
    said lever comprises an L-shaped piece having an upper flat shelf for supporting a disk when inserted into said disk holder.

* * * * *